United States Patent
Heinrich et al.

(10) Patent No.: US 6,991,434 B2
(45) Date of Patent: Jan. 31, 2006

(54) METHOD OF PRODUCING COMPONENTS SUBJECTED TO FLOW, AND COMPONENTS MADE BY SAID METHOD

(75) Inventors: Stefan Heinrich, Adelshofen (DE); Johann Schnellbach, Karlsfeld (DE); Hans Zimmermann, Landshut (DE)

(73) Assignee: MTU Aero Engines GmbH, Munich (DE)

( * ) Notice: Subject to any disclaimer, the term of this patent is extended or adjusted under 35 U.S.C. 154(b) by 254 days.

(21) Appl. No.: 10/461,872

(22) Filed: Jun. 16, 2003

(65) Prior Publication Data

US 2004/0184920 A1 Sep. 23, 2004

(30) Foreign Application Priority Data

Mar. 19, 2003 (DE) .......................................... 103 12 224

(51) Int. Cl.
*B63H 1/26* (2006.01)

(52) U.S. Cl. ................................ 416/241 R; 416/96 R; 29/402.13; 29/889.1

(58) Field of Classification Search ............ 416/241 R, 416/96 R, 229 A, 115, 223 A; 415/200; 29/402.13, 29/402.08, 889.1–889.7
See application file for complete search history.

(56) References Cited

U.S. PATENT DOCUMENTS

| 4,031,809 A | * | 6/1977 | Shraiman et al. ............. 409/84 |
| 5,193,314 A | * | 3/1993 | Wormley et al. ............... 451/5 |
| 5,676,505 A | * | 10/1997 | Gauss et al. ................. 409/132 |
| 5,931,616 A | * | 8/1999 | Daub .......................... 409/132 |
| 6,077,002 A | | 6/2000 | Lowe .......................... 409/132 |
| 6,547,545 B1 | * | 4/2003 | Jonsson et al. ............. 418/195 |
| 2003/0039547 A1 | | 2/2003 | Bourgy et al. |

FOREIGN PATENT DOCUMENTS

| CA | 2353694 | 5/2000 |
| EP | 1 128 933 | 11/1999 |
| EP | 1128933 | 9/2001 |

OTHER PUBLICATIONS

German Office Action dated Dec. 10, 2003.

* cited by examiner

*Primary Examiner*—F. Daniel Lopez
*Assistant Examiner*—James M. McAleenan
(74) *Attorney, Agent, or Firm*—Crowell & Moring LLP

(57) ABSTRACT

The invention relates to a method of producing disc-shaped or ring-shaped components subjected to flow. The components are produced by milling and finish machining downstream of the milling, the component being milled out of a workpiece, and a finish machining medium flowing through the component for the finish machining after the milling. The component is milled out of the workpiece in such a way that milling ridges which are produced run approximately perpendicularly to an aerodynamic direction of flow through the component during operation. The direction of flow of the finish machining medium through the component or the rotor disc therefore runs transversely, preferably perpendicularly, to the milling ridges appearing during the prior milling step.

24 Claims, 3 Drawing Sheets

METHOD OF PRODUCING COMPONENTS SUBJECTED TO FLOW, AND COMPONENTS MADE BY SAID METHOD

BACKGROUND AND SUMMARY OF THE INVENTION

This application claims the priority of German Application No. 103 12 224.9-14 filed Mar. 19, 2003, the disclosure of which is expressly incorporated by reference herein.

The invention relates to a method of producing components subjected to flow and components made by said method. Preferred embodiments of the invention related to methods of producing disc-shaped or ring-shaped components subjected to flow, in particular of rotor discs having integral blading for turbomachines, by milling and finish machining subsequent to the milling, the component being milled out of a workpiece, and a finish machining medium flowing through the component for the finish machining after the milling.

During the production of components subjected to flow, in particular during the production of rotor discs or rings with integrated blading, as a rule, the procedure according to the prior art is that the component subjected to flow is milled out of a workpiece and the component produced by milling is subsequently subjected to finish machining.

U.S. Pat. No. 6,077,002 discloses a milling method for producing rotor discs having integrated blading. In the milling method shown there, a milling cutter is moved relative to the workpiece to be machined in such a way that milling ridges which appear are oriented approximately parallel to the aerodynamic direction of flow through the component during operation, e.g. during subsequent use in a gas turbine.

European Patent Document EP 1 128 933 B1 (corresponding Canadian Patent 2,343,694) discloses an arrangement for the finish machining of rotor discs having integral blading. To this end, a finish machining medium flows through the component produced by milling. The prior art according to European Patent Document EP 1 128 933 B1 relates to "chemically assisted barrelling".

Starting therefrom, a problem underlying the present invention is to provide a novel method of producing rotationally symmetrical components.

This problem is solved in that the method mentioned at the beginning for producing components subjected to flow is developed by providing a method of producing disc-shaped or ring-shaped components subjected to flow, in particular of rotor discs having integral blading for turbomachines, by milling and finish machining subsequent to the milling, the component being milled out of a workpiece, and a finish machining medium flowing through the component for the finish machining after the milling, wherein the component is milled out of the workpiece in such a way that milling ridges which are produced extend approximately perpendicularly to a direction of flow of the finish machining medium at the component.

The method according to the invention for producing disc-shaped or ring-shaped components subjected to flow relates, inter alia, to the production of rotor discs having integral blading, i.e. of "blisks" (bladed disks), for all turbomachines, in particular gas turbines.

The rotor discs are produced by milling and by finish machining downstream of the milling, the component being milled out of a workpiece, and a finish machining medium flowing through the component for the fine machining after the milling.

According to preferred embodiments of the invention, the component is milled out of the workpiece in such a way that milling ridges which are produced run or extend approximately perpendicularly to the direction of flow of the finish machining medium at the component. The direction of flow of the finish machining medium at the component or the rotor disc therefore runs transversely, preferably perpendicularly, to the milling ridges appearing during the upstream milling. As a result, the effectiveness of the finish machining is markedly improved. Manual treatment of the rotor disc and in particular of the rotor blades can be dispensed with. This results in cost advantages and time advantages during the production of rotor discs. The direction of flow of the finish machining medium at the component corresponds approximately to the aerodynamic direction of flow through the component during operation.

According to an advantageous development of the invention, plunge milling is used for the milling, the main feed direction of a milling cutter during the plunge milling running in the direction of its cutter axis. Plunge milling, also called piercing, ensures stable cutter guidance during the milling.

Abrasive flow machining or chemically assisted barrelling is preferably used for the finish machining. Manual treatment of the component can be dispensed with.

A combination of abrasive flow machining or chemically assisted barrelling as finish machining method and plunge milling, the milling ridges produced during plunge milling running approximately perpendicularly to the direction of flow of the finish machining medium at the component, is especially advantageous and effective.

Preferred developments of the invention are set forth in the claims and the following description.

Exemplary embodiments of the invention, without being restricted thereto, are explained in more detail with reference to the drawing.

Other objects, advantages and novel features of the present invention will become apparent from the following detailed description of the invention when considered in conjunction with the accompanying drawings.

DETAILED DESCRIPTION OF THE DRAWINGS

Figure 1:
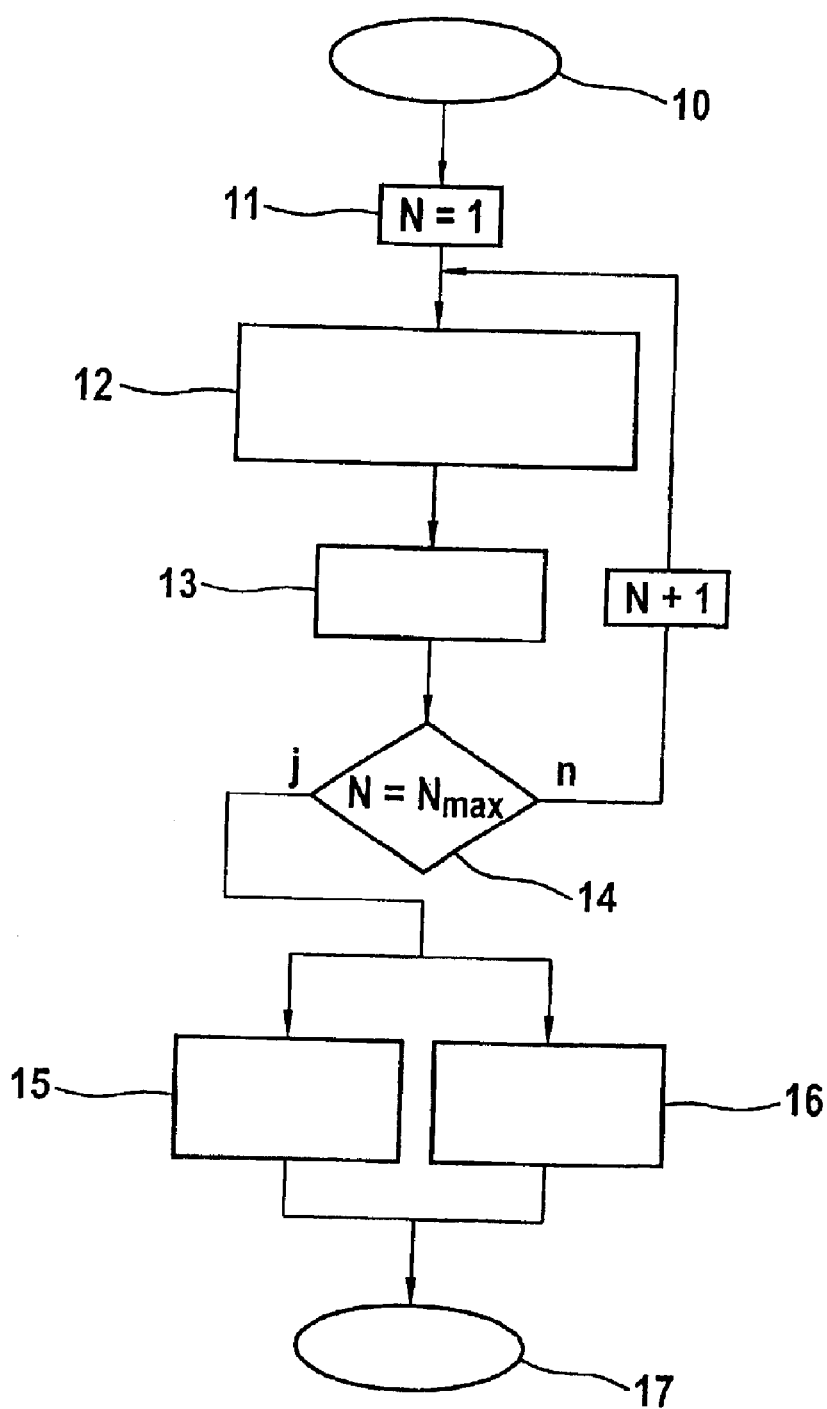
FIG. 1 shows a signal flow diagram for illustrating a first embodiment of the method according to the invention.
Figure 2:
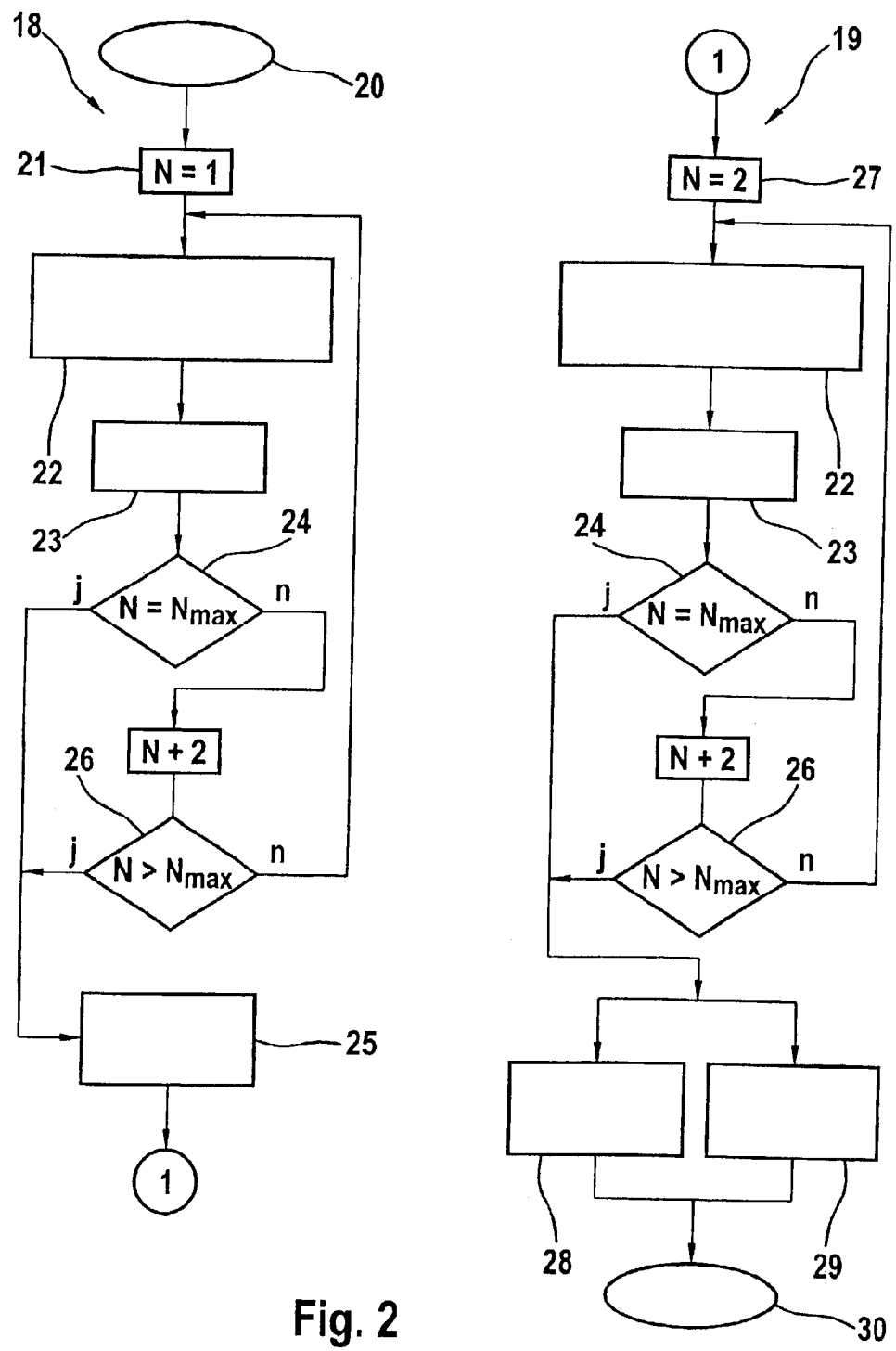
FIG. 2 shows a signal flow diagram for illustrating a second embodiment of the method according to the invention.

FIGS. 1 and 2 show signal flow diagrams of two different exemplary embodiments of the method according to the invention. However, both exemplary embodiments relate to the production of "blisks" (bladed disks). A blisk is a rotor disc with integrated blades.

In the exemplary embodiments according to FIGS. 1 and 2, a rotor disc having a total of $N_{max}$ integrated blades is thus to be produced. To this end, a total of $N_{max}$ channels are to be made in a workpiece by milling, two adjacent blades being bounded from one another by one channel in each case.

In the exemplary embodiment according to FIG. 1, the production method is started in a first step 10, and, after the start, a counter N is set to the value 1. By means of the counter or the corresponding counting function, the number of channels to be incorporated in the workpiece by milling is monitored or counted.

After the start of the production method according to step 10 and the setting of the counter N to the value 1 according to step 11, a first channel is milled in the workpiece according to step 12. The milling method used is "plunge milling", the main feed direction of a milling cutter during plunge milling running in the direction of its cutter axis. In step 12 of the method according to the invention, the corresponding channel is milled out between two adjacent blades. The "annular space" and the "fillet" of the rotor disc are then milled according to step 13 in the region of this channel.

It is then checked according to step 14 whether the status of the counter N corresponds to the maximum number $N_{max}$ of the channels or blades to be produced or milled out. If this is not the case, the counter N is increased by 1 and the process branches back to step 12. The milling-out of the next channel between two adjacent moving blades is then started. In the exemplary embodiment according to FIG. 1, the channels are therefore milled in such a way as to follow an ordinal number, i.e. first the first channel, then the second channel, then the third channel and ultimately the $N_{max}$th channel are milled.

If it is found during the check in step 14 that the number of actual milling steps corresponds to the total number $N_{max}$ of the channels to be milled, the milling is stopped and the process branches to downstream finish machining of the finish-milled component.

In connection with the milling, it is within the scope of the invention for the milling of the workpiece to be carried out in such a way that milling ridges produced on the surface of the component to be produced run approximately perpendicularly or transversely to a subsequent aerodynamic direction of flow through the component during operation.

The finish machining method used is either "chemically assisted barrelling" or "abrasive flow machining". Step 15 according to FIG. 1 illustrates the option of abrasive flow machining, the alternative step 16 illustrates the option of chemically assisted barrelling. During both abrasive flow machining and chemically assisted barrelling, a finish machining medium is moved relative to the surface of the component to be produced. The finish machining medium therefore flows through the component during the finish machining.

In accordance with the invention, the direction of flow of the finish machining medium at the milled component runs approximately perpendicularly to the direction of the milling ridges produced during the milling. This provides for very effective material removal during the finish machining. Manual preliminary treatment of the component can be completely dispensed with. After finish machining has been affected according to step 15 or step 16, the production method is ended according to step 17.

FIG. 2 shows a second embodiment of the method according to the invention. In the exemplary embodiment in FIG. 2, unlike in the exemplary embodiment according to FIG. 1, the channels for exposing the blades are not milled in a continuous sequence but rather are milled in such a way that first the channels are milled with an odd ordinal number in a first main step 18 of the method and with an even ordinal number in a downstream, second main step 19. In the first main step 18, first the first channel, then the third channel, then the fifth channel, etc., are milled; and in the subsequent second main step 19, first the second channel, then the fourth channel, then the sixth channel, etc., are milled, until ultimately all $N_{max}$ channels or blades are milled out.

Thus, according to FIG. 2, the method according to the invention of the second exemplary embodiment or the first main step 18 of the same is started in step 20, and the counter N is set to 1 in step 21. The first channel is subsequently milled in step 22, and the milling of the annular space and of the fillet in the region of this channel is subsequently affected in accordance with step 23. It is then checked in the downstream step 24 whether the number of channels actually milled corresponds to the maximum number $N_{max}$ of channels to be milled. If this is the case, the process branches to step 25. However, if this is not the case, the counter N is increased by 2 and it is checked in step 26 whether the actual counter status N is now greater than $N_{max}$. If this is the case, the process branches again to step 25. However, if the actual counter status N in step 26 is less than the number of maximum channels $N_{max}$ to be milled, the process branches back to step 22. With the directly adjoining channel being omitted, the next channel between two adjacent guide blades is milled out. All the channels with an odd ordinal number are therefore milled in the first main step 18.

If all the channels having an odd ordinal number have been milled out, according to step 25, a thermally meltable material is poured into all the channels milled out previously. After the previously milled channels having an odd ordinal number have been filled according to step 25, the counter N is set to the value 2 according to step 27. This corresponds to the start of the second main step 19.

In conformity with the first main step 18, all the channels having an even ordinal number are then subsequently milled in the second main step 19. The same reference numerals are therefore used for the same method steps in order to avoid repetitions.

As soon as all the channels having an even ordinal number have been milled out in the second step 19, the process again branches to the finish machining of the milled-out component in accordance with the steps 28 or 29, respectively. Step 28 again corresponds to the option of the abrasive flow machining as finish machining. Step 29 corresponds to the alternative option of the chemically assisted barrelling as finish machining method. After the finish machining has been affected, the production method is ended in accordance with step 30.

The milling in the exemplary embodiment of the inventive method according to FIG. 2 is also affected in such a way that milling ridges appearing during the milling extend approximately perpendicularly to the aerodynamic direction of flow through the component during operation.

Figure 3:
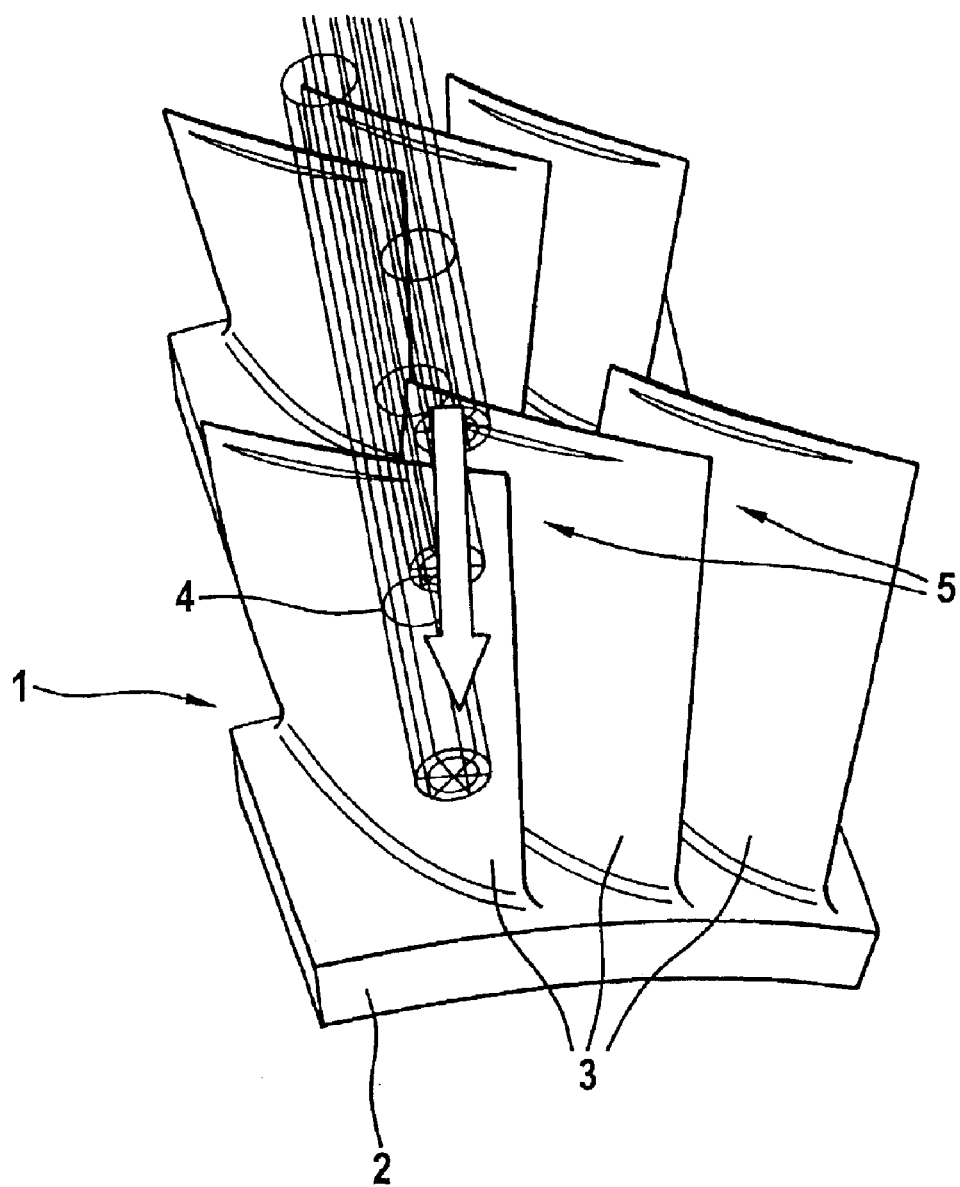
FIG. 3 shows a perspective partial view of a component which has a rotor carrier and blades and which is made according to methods of the present invention.

FIG. 3 shows a partial perspective view of a component 1 which has a rotor carrier 2 and a multiplicity of blades 3 integrally connected to it. The component 1 is rotationally symmetrical and is used in operation in turbomachines, in particular gas turbines. In FIG. 3, a further blade row is partly shown behind the component 1, thus indicating that a plurality of such blade rows can be arranged one behind the other in a turbomachine, in particular a gas turbine.

A milling cutter 4 is shown in FIG. 3, the main feed direction of the milling cutter 4 running approximately in the direction of its cutter or longitudinal axis. To improve the machining, the main feed direction and the cutter axis may be adjusted slightly angled relative to one another. During the milling process, the material removal is affected in particular by moving the milling cutter 4 in its main feed direction, the milling cutter 4 subsequently being pulled out like a drill, being displaced and being moved again in its main feed direction for further material removal. The fluidically effective surfaces of the component 1, i.e. in particular the surfaces of the blades 3 and the entire root region of the blades 3 and the annular space, which is formed by the outer surface of the rotor carrier 2, are machined by the finish machining.

The idea underlying the present invention does not lie solely in the selection of a special milling method or finish machining method but rather in the combination of a milling method and a downstream finish machining method, the milling method being carried out in such a way that milling ridges appearing during the milling extend approximately perpendicularly to the direction of flow of a finish machining medium at the component. The present invention is especially advantageous when plunge milling is used as the milling method and either chemically assisted barrelling or abrasive flow machining is used as the finish machining method.

In accordance with the invention, effective removal of the milling ridges can be achieved during the downstream finish machining. Manual preliminary treatment of the component can be dispensed with.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method of producing disc-shaped or ring-shaped components subjected to flow, in particular of rotor discs having integral blading for turbomachines, by milling and finish machining subsequent to the milling, the component being milled out of a workpiece, and a finish machining medium flowing through the component for the finish machining after the milling,
   wherein the component is milled out of the workpiece in such a way that milling ridges which are produced extend approximately perpendicularly to a direction of flow of the finish machining medium at the component.

2. Method according to claim 1, wherein a plunge milling is used for the milling, a main feed direction of a milling cutter during the plunge milling running at least approximately in the direction of its cutter axis.

3. Method according to claim 2, wherein abrasive flow machining is used for the finish machining.

4. Method according to claim 2, wherein chemically assisted barrelling is used for the finish machining.

5. Method according to claim 2, wherein the direction of flow of the finish machining medium at the component is selected in accordance with the aerodynamic direction of flow through the component during operation.

6. Method according to claim 2, wherein the milling ridges run in the main feed direction of the milling cutter.

7. Method according to claim 1, wherein abrasive flow machining is used for the finish machining.

8. Method according to claim 7, wherein the direction of flow of the finish machining medium at the component is selected in accordance with the aerodynamic direction of flow through the component during operation.

9. Method according to claim 7, wherein the milling ridges run in the main feed direction of the milling cutter.

10. Method according to claim 1, wherein chemically assisted barrelling is used for the finish machining.

11. Method according to claim 10, wherein the direction of flow of the finish machining medium at the component is selected in accordance with the aerodynamic direction of flow through the component during operation.

12. Method according to claim 10, wherein the milling ridges run in the main feed direction of the milling cutter.

13. Method according to claim 1, wherein the direction of flow of the finish machining medium at the component is selected in accordance with the aerodynamic direction of flow through the component during operation.

14. Method according to claim 13, wherein the milling ridges run in the main feed direction of the milling cutter.

15. Method according to claim 1, wherein by milling out a multiplicity of channels uniformly distributed over a circumference of the component, fluidically effective blades lying in between the channels are produced or generated.

16. Method according to claim 1, wherein the entire fluidically effective surface of the component integral blading surface is covered by the finish machining.

17. Method according to claim 1, wherein the duration of the finish machining is set in such a way that the structure of the milling ridges is smoothed down to a size which can be tolerated aerodynamically or in terms of strength, or is smoothed completely.

18. A rotor disk with a plurality of rotor blades made by the method of claim 1.

19. A method of making a rotor disk with a plurality of rotor blades integrally formed thereon, comprising:
   providing a blank of material,
   rough milling said blank to form a plurality of radially extending blades separated by channels formed by rough milling forming milling ridges along said channels, and
   finish machining said blades while directing a flow of finish machining medium against said blades in a flow direction extending transversely to the milling ridges formed during the rough machining.

20. A method according to claim 19, wherein said flow direction is substantially perpendicular to the milling ridges.

21. A method according to claim 20, wherein a plunge milling is used for the milling, a main feed direction of a milling cutter during the plunge milling running at least approximately in the direction of its cutter axis.

22. A method according to claim 19, wherein a plunge milling is used for the milling, a main feed direction of a milling cutter during the plunge milling running at least approximately in the direction of its cutter axis.

23. A method according to claim 19, wherein abrasive flow machining is used for the finish machining.

24. A method according to claim 19, wherein chemically assisted barrelling is used for the finish machining.

* * * * *